3,801,513
CARBON CONTAINING MOLECULAR SIEVES

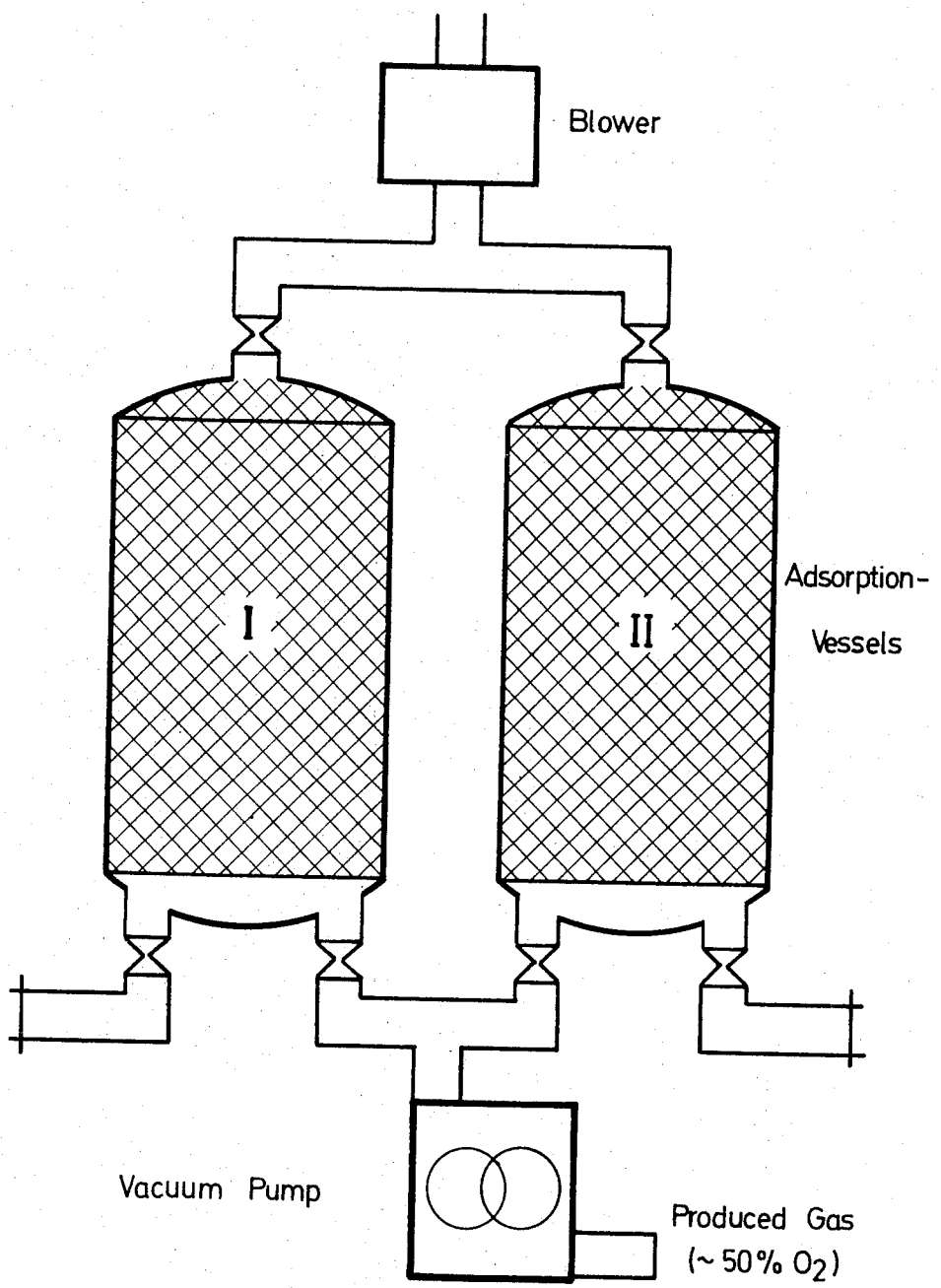

Heinrich Munzner, Essen-Kray, Heinrich Heimbach, Bochum, Werner Korbacher, Essen-Borbeck, Werner Peters, Wattenscheid, Harald Juntgen, Essen-Heisingen, Karl Knoblauch, Essen, and Dieter Zundorf, Essen-Heisingen, Germany, assignors to Bergwerksverband GmbH, Essen-Kray, Germany
Filed July 9, 1971, Ser. No. 161,211
Claims priority, application Germany, Apr. 23, 1971, P 21 19 829.8
Int. Cl. C01b *31/08, 31/16*
U.S. Cl. 252—421                                    10 Claims

ABSTRACT OF THE DISCLOSURE

Process for preparing carbon containing molecular sieves adapted for separating small molecular gases in particular oxygen from nitrogen which comprises treating coke having a content of volatile components of up to 5% at 600–900° C. with a carbonaceous substance which splits off carbon whereby the split-off carbon is deposited in the carbon framework of the coke under narrowing of the existing pores.

---

This invention relates to a carbon containing molecular sieve and more particularly to a carbon containing molecular sieve characterized by its ability to separate small molecular gases from gas mixtures containing the same.

The known silicate molecular sieves are possessed of the property that they can adsorb a single gas from gas mixtures containing the same. The carbon containing molecular sieves such as those manufactured by pyrolysis of plastics e.g. polyvinylidene chloride do not evidence any or only a very slight selectivity respecting the adsorption of gases having similar gas kinetic molecular diameters, such as for instance oxygen and nitrogen, argon and oxygen or helium and methane. Therefore for carrying out a practical and technical scale separation of oxygen and nitrogen from air, the known carbon containing molecular sieves are not suitable and especially so since it is difficult to obtain them in large amounts.

The object of the instant invention is a new type of carbon containing molecular sieve which is characterized in that it can for example adsorb oxygen more rapidly from air than nitrogen.

Another object of this invention is to provide a simple and economically feasible method of manufacturing such carbon containing molecular sieves.

Still another object of this invention is to provide a method for the preparation of such molecular sieves which affords the possibility of setting up large-scale installations for gas separation procedures in connection with which these molecular sieves will be used in ton amounts.

Still another object of this invention is to provide a process for increasing the oxygen content in air to provide concentrations of up to 75% $O_2$.

These and other objects and advantages of the invention will become apparent from a consideration of the following disclosure.

In accordance with the invention it has now been found that coke having a content of volatile components of up to 5% on being treated for a certain time at 600–900° C. with a carbonaceous substance which splits off splitting off carbon results in the formation of molecular sieves of excellent quality. In accordance with the invention there is now provided a process for manufacturing carbon containing molecular sieves for use in the separation of small molecular gases in particular oxygen from nitrogen which comprises treating coke having a content of volatile components of up to 5% with a carbonaceous substance which splits off carbon at 600–900° C. whereby the coke undergoes narrowing of the pores already present therein. The finely dispersed carbon formed is deposited out in the already small pores of the coke and brings about a further decrease in the pore size of the coke's already relatively small pores.

To produce a molecular sieve type carbon suitable for separating oxygen from nitrogen, the average pore size of the ultra fine pore system must be below approximately 3 A. after treatement. For separating even smaller gas molecules, this average pore diameter has to be even smaller. By changing the intensity of the treatment of the coke with carbonaceous substances which split off splitting off carbon at 600–900° C., the average pore diameter can be adjusted according to the gas mixture to be separated therewith.

The quality and suitability of the coke thus produced can be established by passing air for a one minute period upwardly through a tube (1 l.) filled with the carbon containing molecular sieves, the gas being conducted at a velocity of 30 cm./sec. and thereafter analyzing the adsorbed gas following desorption by suction.

When tested as just set out, coke produced in accordance with the invention results in a gas having a composition of 35 and more volume percent oxygen and 65 or less volume percent of nitrogen.

In order to obtain the desired construction or narrowing of the pores, the treatment of the coke with the carbonaceous substance which splits off carbon is carried out for from 1 to 60 minutes and even longer. The cooling of the heated material is then carried out most advantageously in the treatment atmosphere. There can also be used during the cooling streams of an inert gas for instance, nitrogen. This accelerates the cooling and serves the additional purpose that in the cooling the introduction of any oxygen is avoided.

As coke, there is suitable for use in the process all forms of coke containing up to 5% volatile components such as cokes derived from mineral coal including anthracite, brown coal, peat coconut shell and wood and also the known petroleum cokes, cokes prepared by the pyrolysis of plastics and active carbons. In order that the gases to be separated can pass through the molecular sieves it is advantageous in acordance with the invention that as starting material there by used a coke having a designated particle size and in particular having a particle size of from 0.1–20 mm.

As carbonaceous substance which splits off carbon there may be advantageously used in the treatment the exhaust gas of a coke forming process long distance illuminating gas, city gas, coking gas and all of the known carbonaceous substances which are thermally decomposed with the splitting off of carbon such as benzene, toluene, xylene, naphthalene, methane, ethane, hexane, cyclohexane, ethylene, acetylene, methanol, ethanol, isopropanol, ethylene chloride and tetrachlorinated hydrocarbons.

Instead of using coke which is through size reduction brought to the desired particle size, there can also be used in accordance with the invention, coke formed and shaped to have the respective dimensions. In this connection, there come into consideration ball-, cylinder-, hollow cylinder- and egg-shaped coke particles as well as larger coke briquettes which are reduced to the required particle size. The manufacturing of shaped coke particles can take place using various methods:

(1) Coke and/or carbon is suitably formed into briquettes according to any desirable briquette-forming process, for instance under use of 15–40% of a binding agent such as pitch, bitumin, tar or tar oil and the shaped bodies thus formed coked at 600–900° C. The briquetting can take place at normal temperature or increased temperature using a stamping press, extrusion press or rolling press.

(2) Carbon is shaped if necessary to admixture with pitch, bitumin, tar or tar oil and pelleterized to form balls of the desired size and these pellets then coked.

The treatment in accordance with the invention can be carried out by heating the cold coke under an inert gas stream at a temperature of up to 600–900° C. and then under a carbon splitting atmosphere maintained at this temperature for prolonged periods. Alternatively the treatment can be carried out directly after a coking of the starting material in the same or an after arranged reactor. If the coking is carried out with pitch, bitumen, tar or tar oil containing starting materials there are formed in the process, large amounts of gaseous coking products in the heat treatment. As far as these coking products are not for example separated off with a rinsing or scavenger gas, the desired atmosphere is automatically adjusted so that the gas formed coking product already exert the same effect as a carbon splitting off carbonaceous substance. In this case, it is possible to avoid introduction of at least a part of the carbonaceous substance. Often the constitution of the coke can be modified through the additional introduction of carbonaceous substance and also in such cases there can be provided a further increase in the separating capacity of the coke.

Technical application of the molecular sieve type carbons which are intended to increase the oxygen content in air or another component in a known gas mixture is further explained by the process illustrated in the drawing which forms a part of this disclosure. In the process, two adsorption vessels I and II are alternately charged with air and depleted of the accumulated oxygen by suction. The pressure during the charging phase is maintained at between 0 and 40 atm., desorption taking place at pressures ranging to a minimum of 20 torr. The duration of the adsorption respectively desorption phases is between 0.5 to 5 minutes. The gas volume necessary for the charge cycle amounts to 2 to 20 times that of the adsorption vessel.

The following examples are given in order to more fully illustrate the invention and are in no way to be construed as limiting the scope thereof.

EXAMPLE 1

77 weight parts mineral coal having a particle size of 100% <0.08 mm. was treated in a whirling bed with air having a temperature of 230° C. and having an oxygen content of up to 12 weight percent was mixed with 23 weight parts soft pitch (softening point according to Kraemer-Sarnow 52–56° C.) under addition of water, the mixing taking place about 70° C. The resulting mixture was placed in an extruder and formed into cylindrical bodies having a cross-section of 2 mm. The formed bodies were then introduced into a rotating oven where under exclusion of air they were subjected to an average temperature increase of 10° per minute until a final temperature of 800° C. had been obtained. At 750° C. a nitrogen gas stream was introduced into the oven. After reaching a temperature of 800° C. there was introduced together with the nitrogen gas stream 100 g. benzene/Nm.$^3$ and this treatment continued at constant temperature for 20 minutes. Thereafter, the bodies were cooled under pure nitrogen.

The test for evaluation of the resultant bodies as described above was carried out and there was produced a gas having the following composition: 54 volume percent oxygen and 46 volume percent nitrogen. When the test was repeated using instead of air a gas containing 50 volume percent of oxygen and nitrogen the composition of the resulting gas' composition amounted to 83% oxygen and 17% nitrogen.

If instead of air, a gas mixture consisting of 23 volume percent oxygen and 77 volume percent Ar was used the final gas composition contained 59% oxygen and 41% Ar.

EXAMPLE 2

77 weight parts mineral coal having a particle size 100% <0.08 mm. was treated in a whirling layer with air at 230° C. up to an oxygen content of 12 weight percent and mixed with 23 weight parts soft pitch (softening point according to Kraemer-Sarnow 52–56° C.) under addition of water at 70° C. The mixture was placed in an extrusion press and shaped into cylindrical bodies having a cross-section of 2 mm. and treated under exclusion of air in a rotating oven with an average temperature increase of 10° per minute up until a final temperature of 800° C. was reached. The thusly treated bodies had a content of volatile component amounting to 2%. Then under introduction of nitrogen the bodies were cooled to room temperature.

The test for evaluation the bodies resulted in a gas having the following composition: 42 volume percent oxygen and 58 volume percent nitrogen.

EXAMPLE 3

80% anthrazite having 8% volatile components and 20% bituminous coal having a 20.5% volatile component content and a particle size of 0–0.5 mm. whose finest particle component was 55–60% amounting to <0.06 mm. was under spraying of water formed into balls and pelleterized to a size of 3 mm. The pellets were heated in a rotating oven at 750° C. to form coke by passing nitrogen thereover for 30 minutes and then adding 100 g. toluene to the gas stream at Nm.$^3$ to thereby obtain a coke having volatile component content of 3%. Thereafter the coke pellets were cooled under an inert nitrogen gas stream.

The text for evaluating the coke yielded a gas of the following composition: 37 volume percent and 63 volume percent N$_2$.

EXAMPLE 4

76 weight parts wood coke having a particle size 100% <0.1 mm. were mixed with 4 weight parts soft pitch (softening point according to Kraemer-Sarnow of 52–56° C.) under addition of water at about 70° C. The mixture was then introduced into an extrusion press and cylindrical shaped bodies having a cross section of 2 mm. formed. The bodies were introduced into a rotating oven and were heated therein at temperature increases amounting on the average to 10° C. per minute until a final temperature of 800° C. had been reacted, under exclusion of air. Thereafter, under introduction of nitrogen the bodies were cooled to room temperature. The thusly formed product had a volatile component content of 1.5%.

The test for evaluating the quality of the bodies resulted in a gas having a composition of 38 volume percent oxygen and 62 volume percent nitrogen.

EXAMPLE 5

76 weight parts wood coke having a particle size 100% <0.1 mm. were mixed with 24 weight parts soft pitch (softening point according to Kraemer-Sarnow of 52–58° C.) under addition of water at about 70° C. The mixture was then introduced into an extrusion press and formed into cylindrical bodies having a cross section of 2 mm. The bodies were introduced into a rotating oven and under exclusion of air carbonized by increasing the temperature an average of 10° per minute up until a final temperature of 800° C. After a temperature of 750° C. had been reached, a nitrogen gas stream was introduced and after a temperature of 800° C. had been established isopropanol in an amount of 100 g./Nm.$^3$ was charged. The treatment in the isopropanol-nitrogen atmosphere lasted for 20 minutes. Thereafter the bodies were cooled under a pure nitrogen atmosphere.

When the test for evaluating the quality was carried out a gas having a composition of 49 volume percent oxygen and 51 volume percent nitrogen was obtained.

EXAMPLE 6

Coconut shell material having a particle size of 1 to 3 mm. was introduced into a rotating oven and heated up at a rate of 3° per minute until the temperature of 750° C. had been reached and their volatile component content amounted to 4.5%. This temperature was maintained constant for 30 minutes and during this time there was introduced into the oven a stream of ethylene gas. Thereafter the bodies were cooled under pure nitrogen.

When the evaluation test was carried out, a gas having a composition of 50.5 volume percent oxygen and 49.5 volume percent nitrogen was obtained.

EXAMPLE 7

75 weight parts of mineral coal, the particle size of which amounted to 100% <0.08 mm. was preoxidized in a fluidized bed with oxygen at 230° C. to produce a content of oxygen of 12 weight percent. This product was mixed with 20 weight parts soft pitch (softening point according to Kraemer-Sarnow of 52–56° C.) under addition of water at about 70° C. This mixture was then introduced into an extrusion press and cylindrical shaped bodies having a cross section of 2 mm. formed. The bodies were then charged into a rotating oven and heated therein under exclusion of air at an average temperature increase of 10°/min. up until a final temperature of 800° C. Then under introduction of nitrogen, the bodies were cooled to room temperature. In a second treatment step, the product was again heated in nitrogen to 800° C. Then in the nitrogen gas stream low temperature carbonization gas obtained in a coking procedure was introduced. After 30 minutes the bodies were cooled under nitrogen to room temperature.

The test for evaluating the quality of the bodies was carried out and a gas having a composition of 45 volume percent oxygen and 55 volume percent nitrogen obtained.

EXAMPLE 8

Peat coke was worked up to a particle size of from 1 to 3 mm. and heated in a rotating oven under nitrogen to 800° C. There was then introduced with the nitrogen gas stream, gaseous toluene and the temperature maintained constant for 30 minutes. Finally the bodies were cooled in pure nitrogen.

The test for evaluating the quality of the bodies produced a gas having a composition of 36 volume percent oxygen and 64 volume percent nitrogen.

The 2 adsorption vessels as shown in the drawing contain 20 m.$^3$ molecular sieve type carbon, manufactured according to Example 1. During the adsorption cycle 6000 m.$^3$ air, which has neither been dried nor freed of carbondioxide, are charged through each of the adsorption vessels for periods of 100 seconds at a pressure of 1.05 atm. The desorption cycle also takes 100 seconds at a pressure of 50 torr produced by suction. Through alternate operation of the two adsorption vessels a product containing 51% oxygen and 49% nitrogen will be recovered.

Two adsorption vessels, similar to those described in the drawing are filled with 1000 ccm. molecular sieve type carbon manufactured according to Example 6. Adsorption is achieved by pumping a gas volume of 28000 ccm., consisting of 5% He and 95% CH$_4$ alternately into each adsorption vessel, using a pressure of 40 atm. The time required amounts to 30 seconds. In the second step of the procedure the pressure is abruptly released to 1 atm. In step 3, desorption takes place at pressures reaching a minimum of 20 torr by use of vacuum suction, 1000 ccm. of gas will be recovered containing 20% He and 80% CH$_4$.

What is claimed is:

1. A process for the production of a carbon-containing molecular sieve which adsorbs oxygen more readily than nitrogen or argon from mixtures containing oxygen and nitrogen or argone which comprises heating in a closed oven in the absence of air at a coking temperature of at least 600° C., particles of a cokable substance having a size between 0.1 and 20 millimeters until the content of volatile components in the resulting coke is not more than 5% by weight and thereafter subjecting the resulting coke to heating in an inert atmosphere at a temperature between 600 and 900° C. while a gaseous stream of a carbonaceous substance which splits off carbon at said temperature is passed into contact with the said coke for such a period between 1 and 60 minutes that the carbon that is thus split off is deposited in the pores of the coke and reduces the effective average size of the pores to less than about .3 millimicron.

2. A process as defined in claim 1 in which the cokable substance is preliminarily subjected after comminution into small particles to oxidation at a temperature of approximately 230° C.

3. A process as defined in claim 1 in which cokable substance after cominution into small particles is formed into small shaped bodies with an amount between 15 and 40% by weight of a binding agent.

4. A process as defined in claim 1 which comprises comminuting a cokable substance into particles having a size smaller than 80 microns and preoxidizing the said particles in a fluidized bed with an oxygen-containing gas at a temperature of approximately 230° C. until the particles have an oxygen content of approximately 12% by weight, mixing the said particles with a soft pitch to form a pasty mass and extruding the said mass into shaped bodies having a size of approximately 2 millimeters, coking the said shaped bodies in the absence of air by gradually increasing the temperature thereof to approximately 800° C. and thereafter passing a stream of nitrogen together with a carbonaceous substance which splits off carbon at a temperature between 600 and 900° C. over the said shaped coked bodies while they are maintained at a temperature at which carbon is split off from the carbonaceous substance for such a period between 1 and 60 minutes that the carbon that is split off and is deposited in the pores of the coke reduces the effective average size of the pores thereof to less than about .3 millimicron.

5. Process according to claim 1 wherein the carbonaceous substance is the gaseous product produced in the carbonization of pitch, bitumen, tar or tar oil.

6. Process according to claim 1 wherein the carbonaceous substance is at least one member selected from the group consisting of coke gas, long distance illuminating gas and city gas.

7. Process according to claim 1 wherein the carbonaceous substance is a member selected from the group consisting of benzene, toluene, xylene, naphthalene, methane, ethane, hexane, cyclohexane, ethylene, acetylene, methanol, ethanol, isopropanol, methylene chloride and tetrachlorinated hydrocarbons.

8. Process according to claim 1 wherein said coking is carried out by gradually raising the temperature by about 3–10° C. per minute.

9. Process as defined in claim 1 in which an inert gas is introduced into the closed oven concurrently with the introduction of the carbonaceous substance.

10. A process as defined in claim 1 in which the cokable substance is a substance of the group consisting of coals and peat which has been comminuted and formed into small shaped bodies by use of a binding agent of the group consisting of pitches, bitumens, tar and tar oils before coking.

References Cited

UNITED STATES PATENTS

| | | | |
|---|---|---|---|
| 2,703,780 | 3/1955 | Voorhies | 252—444 X |
| 3,202,720 | 8/1965 | Hauptschein et al. | 252—444 X |
| 2,448,337 | 8/1948 | Wickenden | 252—445 X |
| 2,761,822 | 9/1956 | Addison | 252—445 X |
| 1,968,847 | 8/1934 | Morrell | 252—445 X |
| 2,008,146 | 7/1935 | Morrell | 252—445 X |
| 3,592,779 | 7/1971 | Kiikka | 252—444 X |
| 3,533,961 | 10/1970 | Voet et al. | 252—421 |

FOREIGN PATENTS

| | | | |
|---|---|---|---|
| 614,232 | 2/1961 | Canada | 252—445 |
| 608,038 | 11/1960 | Canada | 252—444 |
| 1,138,307 | 1/1969 | Great Britain | 252—444 |

PATRICK P. GARVIN, Primary Examiner

U.S. Cl. X.R.

252—444, 445; 423—217